Figure 1:
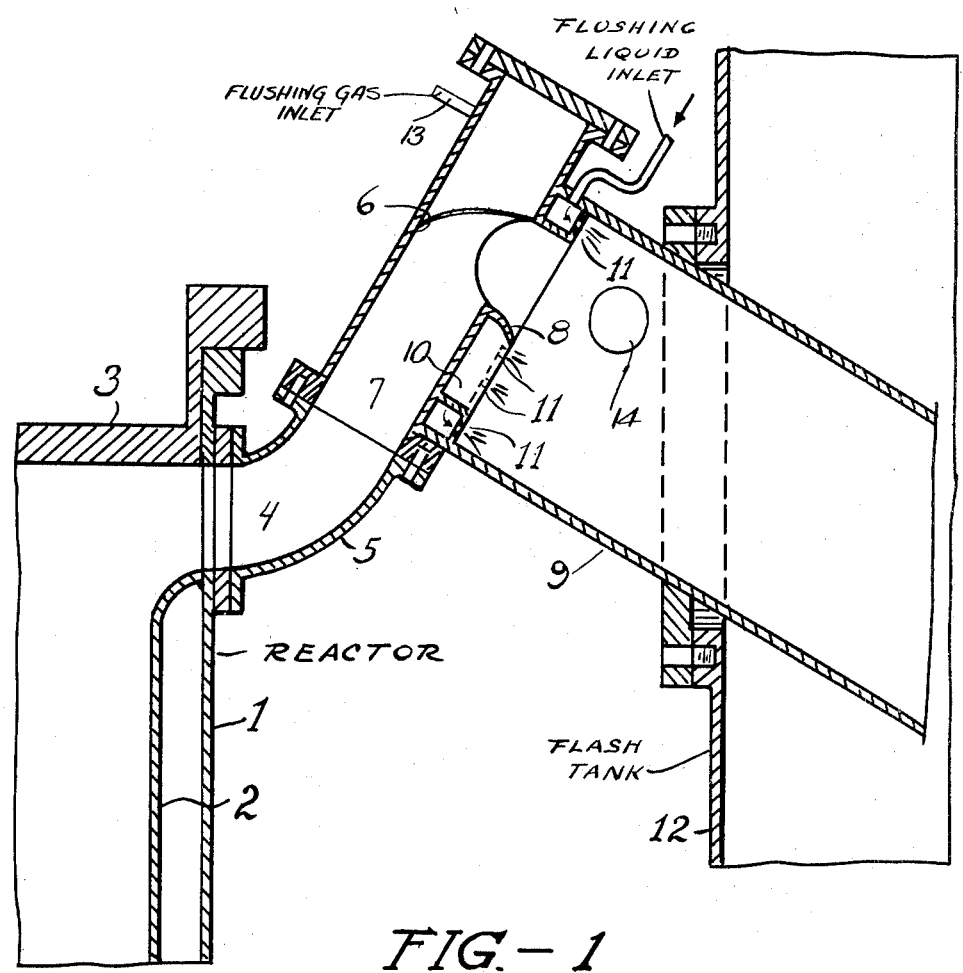
Figure 2:
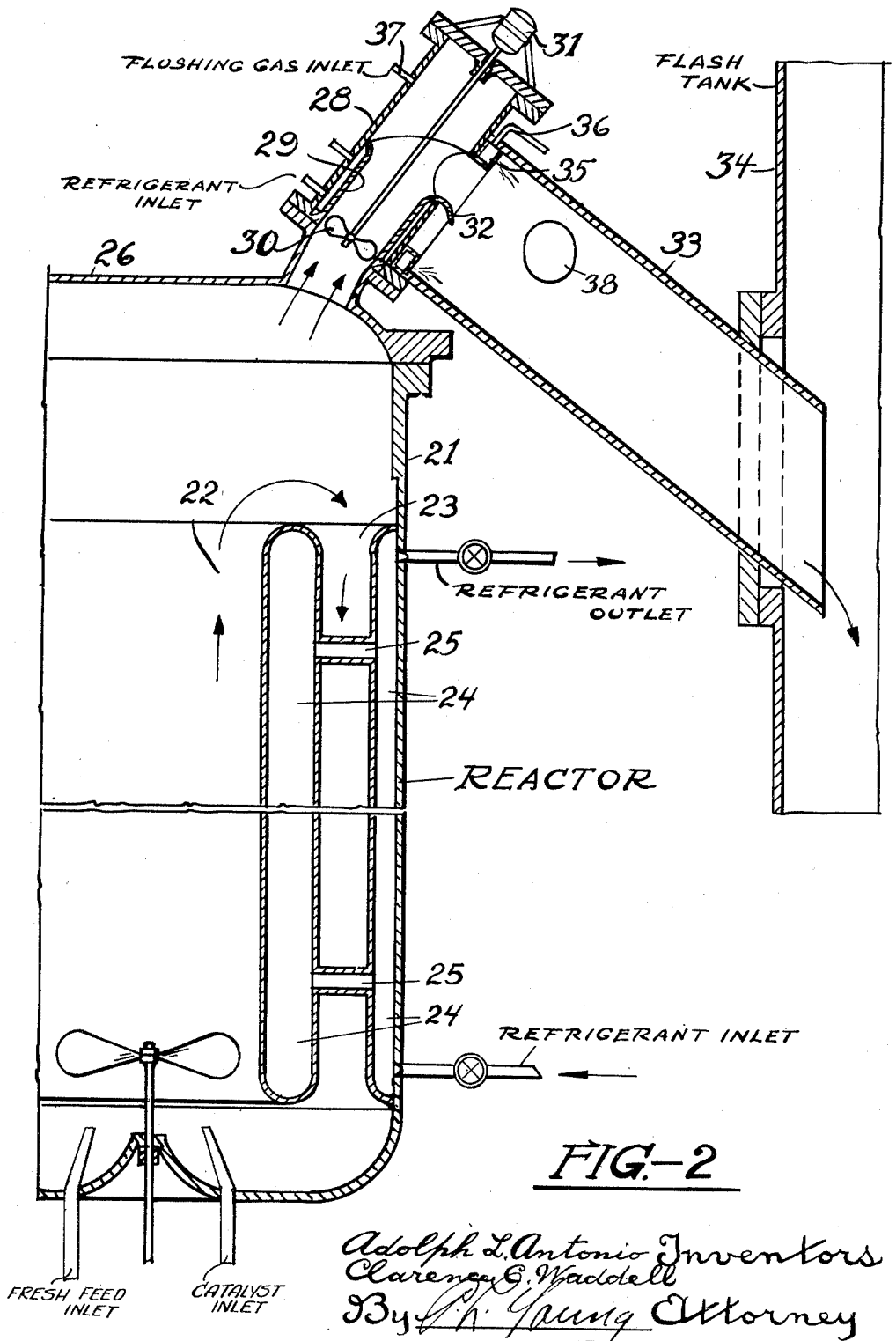

Patented Apr. 18, 1950

2,504,488

UNITED STATES PATENT OFFICE 2,504,488

REACTOR

Adolph L. Antonio, Pasadena, Calif., and Clarence C. Waddell, Aruba, Netherlands West Indies, assignors to Standard Oil Development Company, a corporation of Delaware Application October 12, 1945 Serial No. 622,074

8 Claims. (Cl. 23—285)

The present invention pertains to the preparation of polymers from isomonoolefins or mixtures of isomonoolefins and diolefins by the treatment thereof with Friedel-Crafts type catalysts at low temperatures, and in particular to a novel reactor which may be utilized for continuous operation of the foregoing reactions.

High molecular weight polymers such as polyisobutylene of 15,000–25,000 up to about 300,000 molecular weight (as determined by the Staudinger method) have been prepared by polymerizing isobutylene in contact with a Friedel-Crafts type catalyst at temperatures below 10° F. and preferably below —40° F. Products which are vulcanizable or curable with sulfur are obtained if a minor proportion of a diolefin is added to a major proportion of an isomonoolefin and the resultant mixture is polymerized at temperatures below 10° F. and preferably at or about —150° F. by the application thereto of a solution of a Friedel-Crafts type catalyst in a solvent which is liquid at reaction temperatures and which does not form a complex with the catalyst, such as a lower alkyl halide, carbon disulfide or the like. These polymerizations have been carried out batchwise and continuously and with liquefied ethylene added to the reaction mixture as a diluent-refrigerant or in the presence of substantial amounts of alkyl halides and the like as diluents in apparatus provided with means for absorbing the exothermic heat of reaction. The latter has in general been found to be the preferred method of conducting the polymerization since it not only lends itself well to continuous operation but is capable of better control with the formation of polymers of improved physical characteristics in greater yields. Essentially, the reactors for this type of operation comprise a draft tube provided with an agitator arranged centrally of the reactor and a return passageway comprising either a plurality of return tubes affixed between headers arranged around the central draft tube or a continuous annular passageway, thereby permitting rapid circulation of the reaction mixture upwardly or downwardly in the central draft tube and back again through the return tubes or annulus. The draft tube and return passageways are jacketed and a coolant such as liquefied ethylene is circulated in order to remove the heat liberated during the polymerization and maintain the reaction mixture at the low temperature necessary to form products of the desired properties.

The transfer of the polymer slurry from the reactor at about —150° F. to the atmosphere at ordinary temperatures of about 70° F. or to a flash tank at about 150° F. has presented very serious and knotty problems. Although the polymer particles as formed are ordinarily free from tackiness, they become extremely tacky and tend to agglomerate as they are brought from reaction temperature to or above room temperature. The polymer has shown a particularly strong tendency to foul the discharge line from the reactor and ultimately to plug completely said line. Since this ordinarily necessitates shutting down the reactor, warming the same up and cleansing the same with a suitable solvent or dispersion medium for the polymer, a procedure requiring a number of hours for completion, it is obvious that plugging of the discharge line very materially reduces the service factor of the equipment.

It is the object of the present invention to provide the art with a low-temperature polymerization reactor having a novel overflow arrangement which substantially improves the service factor of the reactor.

It is a further object of this invention to provide a low-temperature polymerization reactor having an overflow which permits free discharge of polymer slurry from the reactor.

These and other objects of this invention will appear more clearly from the detailed specification and claims which follow.

It has now been found that the discharge of polymer slurries from continuously operated low temperature reactors may advantageously be effected through a short or stubby overflow line which opens upwardly from the top or substantially the top of the reactor and which discharges the slurry into a copious flow of water or other flashing liquid within a very short distance of the reactor. The use of an upflow discharge line provides a liquid seal on the reactor and thereby eliminates the need for throttling devices in the discharge line.

In the description which follows, reference will be made to the accompanying drawings as showing two forms of reactor overflows in accordance with the present invention. In the drawings, Figure I is a vertical cross-section through a stubby overflow arranged in the side wall of the reactor; and Figure II is a vertical cross-section through a modification of the overflow which is arranged in the removable head of the reactor.

In Figure I, 1 represents a reactor of the heat exchanger type having an inlet for the supply of reactants and diluents, an inlet for the supply of catalyst and agitator means for circulating the contents of the reactor, none of these elements being shown in order to simplify the drawing. A cooling jacket, part of which is shown at 2 is provided for the circulation of a cooling agent such as liquefied ethylene in indirect heat exchange relation with the contents of the reactor. The reactor is provided with a head or cover 3 which is secured to the reactor by any suitable quick-opening means which permits the ready removal of the head for inspection and cleaning of the interior of the reactor. An outlet 4 is arranged at the top of the reactor side wall and comprises a pipe 5 extending upwardly and connecting with an overflow section 6. It is advantageous to arrange the outlet 4 at the very top of the side wall and utilize a flat head or cover 3 as shown in order to avoid the formation of a vapor space at the top of the reactor. The overflow section 6 comprises a tubular lower part or pipe 7 which terminates in a weir 8 which extends into a large diameter flash pipe 9. A manifold 10 is arranged at the inlet end of the flash pipe 9 and is connected with a source of supply of heated flashing liquid, preferably water. The manifold is perforated or slotted as at 11 in such a way as to eject a spray or sheet of flashing liquid over the surface of flashing pipe 9. Ordinarily it will suffice if only the lower half of the flash pipe 9 is covered with a fast moving stream of flashing liquid. The flash pipe 9 is sloped downwardly towards the flash tank proper 12, the discharge end of the flash pipe extending well inside the flash tank. The latter is ordinarily filled about one-sixth to one-third full with a flashing liquid which is vigorously agitated in order to keep the polymer particles well dispersed while open steam is supplied to the flashing liquid to drive off the volatiles from the reaction slurry. An inlet 13 is provided in the overflow pipe 6 for the supply of flushing gas in order to sweep the volatilized materials out of the overflow and flashing pipes. A manhole 14 is arranged in the flash pipe 9 in order that the flow of reaction mixture over the weir 8 may be readily observed and easily reached in the event that the weir becomes fouled with polymer and cleaning or scraping becomes necessary.

A further embodiment of the present invention is shown in Figure II wherein 21 represents a reactor which may comprise a central draft tube 22 and a return annular passageway 23. A cooling jacket 24 is provided for the circulation of a suitable refrigerant, such as liquefied ethylene, in indirect heat exchange relation to the reaction mixture to maintain the same at the desired temperature level, connectors 25 being provided to carry the refrigerant across the annular passageway to the inner section of the cooling jacket 24. The reactor is provided with a quick-opening head 26 having an outlet opening 27 in the top thereof. The outlet opening 27 is so arranged in the head 26 that there is no vapor space at the top of the reactor. This is highly desirable since the polymer has a pronounced tendency to deposit upon the reactor surface at a liquid-gas interface. While the outlet is shown in the reactor head, it will be understood that it could also be arranged at the top of the side wall of the reactor as shown in Figure I in the event that it is desired to keep the head or cover 26 free from encumbrances which would interfere with the rapid removal of the head for inspection or cleaning. The reactor is usually provided with a layer of heat insulation in order to minimize the loss of refrigeration.

The reactor overflow proper comprises a casing 28 which is secured to the outlet 27 by any suitable means, preferably of a quick opening type in order that it may be readily removed from the head and/or the head removed from the reactor. The casing is provided with a double wall 29 in order to provide a cooling jacket through which a suitable refrigerant such as liquefied ethylene may be circulated if it is desired to maintain the reaction mixture at as low a temperature as possible up to the point at which it is discharged into the flashing liquid. Since the overflow is preferably made as short as possible and the throughput of reaction slurry is usually sufficiently large that the temperature rise in the discharge pipe is negligible, the cooling jacket may be omitted. An agitator 30 driven by a motor 31 is shown in the discharge pipe for keeping the internal surfaces of the discharge pipe clean. The use of this agitator is advisable whenever the liquid velocity through the pipe is very low and obviously may be omitted when the liquid velocity is sufficient to keep the surfaces of the pipe clean.

The discharge pipe terminates in an overflow or weir having a lip 32 which extends well into the flash pipe 33 which is sloped downwardly toward the flash tank 34. A manifold 35 is arranged at the inlet end of the flash line and provided with a connection 36 to a source of flashing liquid, preferably water. The manifold is perforated or slotted in such a way as to eject a spray or sheet of flashing liquid to cover completely all that portion of the interior of the flash line with which the polymer slurry leaving the discharge pipe can come into contact. An inlet 37 for the introduction of flushing gas and a manhole 38 for inspection and cleaning of the weir may also be provided.

The operation of our device is as follows: Liquid ethylene is circulated through the cooling jacket of the reactor as well as the cooling jacket in the discharge pipe if one is provided. Reaction mixture comprising about one part of a 97.5% isobutylene and a 2.5% isoprene mixture in from about three to ten parts of methyl chloride is supplied continuously to the reactor and circulated therein. Catalyst solution comprising about 0.15% of $AlCl_3$ dissolved in methyl chloride is introduced into the reaction mixture continuously and a slurry of polymer particles in reaction mixture continuously flows out of the reactor through the overflow pipe and over the weir. A hot flashing liquid, preferably water at about 150° F., is supplied to the manifold and is sprayed as a fast moving (20 ft. per second or greater) stream onto the inner surfaces of the flash pipe. The cold slurry of polymer in reaction mixture flows over the weir and hits the fast moving stream of hot water which vaporizes unreacted materials and disperses the polymer as a finely divided slurry. The polymer is carried down through the flash line into the main flash tank which contains a substantial quantity of water which is thoroughly agitated by means of suitable stirring or agitating devices and which is heated as by direct introduction of steam in order to flash off any residual volatile materials that may be associated with the polymer. The water slurry of polymer is then, if desired, subjected to a vacuum stripping operation, dewatered and the polymer dried in the usual way.

The apparatus in accordance with the present invention is applicable to the preparation of any solid, high molecular weight, low temperature polymerizates from isoolefinic hydrocarbons or from mixtures of isoolefinic hydrocarbons with a diolefinic compound capable of copolymerizing with isoolefinic materials at low temperatures in the presence of Friedel-Crafts type catalysts. The preferred isoolefin is isobutylene but other isoolefins containing up to 8 carbon atoms per molecule may be used. The copolymerizable diolefinic materials include butadiene and substituted butadienes, especially isoprene, piperylene and dimethyl butadiene. Other polyolefinic materials containing up to 12 or 14 carbon atoms per molecule and certain non-conjugated diolefins, such as dimethyl allene and the like, are also useful. The olefinic materials are preferably mixed with from an equal to a fivefold quantity of a suitable diluent such as methyl or ethyl chloride cooled to temperatures below about —40° F. and polymerized by the addition of a Friedel-Crafts type catalyst dissolved in a solvent which is liquid at reaction temperature and does not form a complex with the catalyst. Such materials include methyl-, ethyl- or propyl-, mono- or polyhalides or carbon disulfide.

The refrigerant which is preferred is liquefied ethylene in view of the fact that it boils at about —155° F. at atmospheric pressure. Other refrigerants such as mixtures of solid carbon dioxide and liquid propane, or liquid ethane, liquid methane, methyl chloride and the like, may be used. The reactants, catalysts, solvents and the like which may be used and the general properties of the polymer formed are described in U. S. Patent No. 2,203,873 and Australian Patent No. 112,875 and its counterpart U. S. Patent No. 2,356,128.

The foregoing description contains a limited number of embodiments of the present invention. It will be understood, however, that such embodiments are only illustrative and that numerous variations are possible without departing from the purview of this invention as defined in the following claims.

What we claim and desire to secure by Letters Patent is:

1. A polymerization reactor comprising a reaction chamber, a refrigerating jacket for indirectly cooling the reaction chamber, means for continuously supplying reactants, diluents and catalyst to the reaction chamber, a stirrer for circulating reaction mixture in the reaction chamber, an outlet pipe for reaction mixture substantially at the top of the reaction chamber, said outlet pipe extending upwardly a minimum distance to keep said reaction chamber completely full and to provide a liquid seal on the reactor, a flashing pipe connected at an angle to said outlet pipe, a jet spray for covering the interior surface of the flashing pipe with a rapidly moving stream of warmed flashing liquid, an overflow on said outlet pipe extending into said flashing pipe permitting the discharge of the reaction mixture into the rapidly moving stream of flashing liquid.

2. A polymerization reactor comprising a reaction chamber, a refrigerating jacket for indirectly cooling the reaction chamber, means for continuously supplying reactants, diluents and catalyst to the reaction chamber, a stirrer for circulating reaction mixture in the reaction chamber, an outlet pipe for reaction mixture at the top of the reaction chamber, said outlet pipe having the upper edge of the bore thereof at the highest point in the said reaction chamber and extending upwardly a minimum distance to keep said reaction chamber completely full and to provide a liquid seal on the reactor, a cooling jacket surrounding said outlet pipe, a supply pipe for circulating a refrigerant through said cooling jacket, a flashing pipe connected at an angle to said outlet pipe, a jet spray for covering the interior surface of the flashing pipe with a rapidly moving stream of warmed flashing liquid, an overflow on said outlet pipe extending into said flashing pipe permitting the discharge of the reaction mixture into the rapidly moving stream of flashing liquid.

3. A polymerization reactor comprising a reaction chamber, a refrigerating jacket for indirectly cooling the reaction chamber, means for continuously supplying reactants, diluents and catalyst to the reaction chamber, a stirrer for circulating reaction mixture in the reaction chamber, an outlet pipe for reaction mixture at the top of the reaction chamber, said outlet pipe having the upper edge of the bore thereof at the highest point in the said reaction chamber and extending upwardly a minimum distance to keep said reaction chamber completely full and to provide a liquid seal on the reactor, a flashing pipe connected at an angle to said outlet pipe, a jet spray for covering the interior surface of the flashing pipe with a rapidly moving stream of warmed flashing liquid, an overflow on said outlet pipe extending into said flashing pipe permitting the discharge of the reaction mixture into the rapidly moving stream of flashing liquid, a duct for introducing a flushing gas into the outlet pipe.

4. A polymerization reactor comprising a reaction chamber, a refrigerating jacket for indirectly cooling the reaction chamber, means for continuously supplying reactants, diluents and catalyst to the reaction chamber, a stirrer for circulating reaction mixture in the reaction chamber, an outlet pipe for reaction mixture at the top of the reaction chamber, said outlet pipe having the upper edge of the bore thereof at the highest point in the said reaction chamber and extending upwardly a minimum distance to keep said reaction chamber completely full and to provide a liquid seal on the reactor, a cooling jacket surrounding said outlet pipe, a duct for circulating a refrigerant through said cooling jacket, a flashing pipe connected at an angle to said outlet pipe, a jet spray for covering the interior surface of the flashing pipe with a rapidly moving stream of warmed flashing liquid, an overflow on said outlet pipe extending into said flashing pipe permitting the discharge of the reaction mixture into the rapidly moving stream of flashing liquid, a duct for introducing a flushing gas into the outlet pipe.

5. A polymerization reactor comprising a reaction chamber, a refrigerating jacket for indirectly cooling the reaction chamber, means for continuously supplying reactants, diluents and catalyst to the reaction chamber, a stirrer for circulating reaction mixture in the reaction chamber, an outlet pipe for reaction mixture at the top of the reaction chamber, said outlet pipe having the upper edge of the bore thereof at the highest point in the said reaction chamber and extending upwardly a minimum distance to keep said reaction chamber completely full and to provide a liquid seal on the reactor, a motor driven agitator in said outlet pipe for keeping the inner walls of said pipe free from polymer deposits, a flashing pipe connected at an angle to said outlet pipe, a jet spray for covering the interior surface of the flashing pipe with a rapidly moving stream of warmed flashing liquid, an overflow on said outlet pipe extending into said flashing pipe permitting the discharge of the reaction mixture into the rapidly moving stream of flashing liquid.

6. A polymerization reactor comprising a reaction chamber, a refrigerating jacket for indirectly cooling the reaction chamber, means for continuously supplying reactants, diluents and catalyst to the reaction chamber, a stirrer for circulating reaction mixture in the reaction chamber, an outlet pipe for reaction mixture at the top of the reaction chamber, said outlet pipe having the upper edge of the bore thereof at the highest point in the said reaction chamber and extending upwardly a minimum distance to keep said reaction chamber completely full and to provide a liquid seal on the reactor, a cooling jacket surrounding said outlet pipe, a duct for circulating a refrigerant through said cooling jacket, a motor driven agitator in said outlet pipe for keeping the inner walls of said pipe free from polymer deposits, a flashing pipe, a jet spray for covering the interior surface of the flashing pipe with a rapidly moving stream of warmed flashing liquid, an overflow on said outlet pipe extending into said flashing pipe permitting the discharge of the reaction mixture into the rapidly moving stream of flashing liquid.

7. A polymerization reactor comprising a reaction chamber, a refrigerating jacket for indirectly cooling the reaction chamber, means for continuously supplying reactants, diluents and catalyst to the reaction chamber, a stirrer for circulating reaction mixture in the reaction chamber, an outlet pipe for reaction mixture at the top of the reaction chamber, said outlet pipe having the upper edge of the bore thereof at the highest point in the said reaction chamber and extending upwardly a minimum distance to keep said reaction chamber completely full and to provide a liquid seal on the reactor, a motor driven agitator in said outlet pipe for keeping the inner walls of said pipe free from polymer deposits, a flashing pipe connected at an angle to said outlet pipe, a jet spray for covering the interior surface of the flashing pipe with a rapidly moving stream of flashing liquid, an overflow on said outlet pipe extending into said flashing pipe permitting the discharge of the reaction mixture into the rapidly moving stream of flashing liquid, a duct for introducing a flushing gas into the outlet pipe.

8. A polymerization reactor comprising a reaction chamber, a refrigerating jacket for indirectly cooling the reaction chamber, means for continuously supplying reactants, diluents and catalyst to the reaction chamber, a stirrer for circulating reaction mixture in the cooling chamber, an outlet pipe for reaction mixture at the top of the sidewall of the reaction chamber, said outlet pipe extending upwardly a minimum distance to keep said reaction chamber completely full and to provide a liquid seal on the reactor, a cooling jacket surrounding said outlet pipe, means for circulating a refrigerant through said cooling jacket, a motor driven agitator in said outlet pipe for keeping the inner walls of said pipe free from polymer deposits, a flashing pipe connected at an angle to said outlet pipe, a jet spray for covering the interior surface of the flashing pipe with a rapidly moving stream of warmed flashing liquid, an overflow on said outlet pipe extending into said flashing pipe permitting the discharge of the reaction mixture into the rapidly moving stream of flashing liquid, a duct for introducing a flushing gas into the outlet pipe.

ADOLPH L. ANTONIO.
CLARENCE C. WADDELL.

REFERENCES CITED

The following references are of record in the file of this patent:

UNITED STATES PATENTS

| Number | Name | Date |
|---|---|---|
| 638,647 | Selwig | Dec. 5, 1899 |
| 1,071,221 | Ellis | Aug. 26, 1913 |
| 1,244,032 | Chappell | Oct. 23, 1917 |
| 1,298,159 | Bennett | Mar. 25, 1919 |
| 1,338,698 | Richardson | May 4, 1920 |
| 1,402,318 | Rodebush | Jan. 3, 1922 |
| 1,410,814 | Kendall | Mar. 28, 1922 |
| 2,324,195 | Carlson et al. | July 13, 1943 |
| 2,407,494 | Hartvigsen | Sept. 10, 1946 |
| 2,408,128 | Squires | Sept. 24, 1946 |